(12) United States Patent
Kim et al.

(10) Patent No.: US 10,929,028 B2
(45) Date of Patent: Feb. 23, 2021

(54) CONTROL DEVICE FOR DYNAMICALLY ALLOCATING STORAGE SPACE AND DATA STORAGE DEVICE INCLUDING THE CONTROL DEVICE

(71) Applicants: SK hynix Inc., Gyeonggi-do (KR); Seoul National University R&DB Foundation, Seoul (KR)

(72) Inventors: Bryan Suk Joon Kim, Seoul (KR); Sang Lyul Min, Seoul (KR)

(73) Assignees: SK hynix Inc., Gyeonggi-do (KR); Seoul National University R&DB Foundation, Seoul (KR)

(*) Notice: Subject to any disclaimer, the term of this patent is extended or adjusted under 35 U.S.C. 154(b) by 83 days.

(21) Appl. No.: 16/284,924

(22) Filed: Feb. 25, 2019

(65) Prior Publication Data

US 2020/0104057 A1    Apr. 2, 2020

(30) Foreign Application Priority Data

Sep. 28, 2018  (KR) .......................... 10-2018-0116646

(51) Int. Cl.
*G06F 3/06* (2006.01)
*G06F 12/02* (2006.01)

(52) U.S. Cl.
CPC ............ *G06F 3/0614* (2013.01); *G06F 3/061* (2013.01); *G06F 3/0604* (2013.01); *G06F 3/0631* (2013.01); *G06F 3/0644* (2013.01); *G06F 3/0659* (2013.01); *G06F 12/0246* (2013.01)

(58) Field of Classification Search
CPC ................................................... G06F 3/0614
USPC ........................................................ 711/112
See application file for complete search history.

(56) References Cited

U.S. PATENT DOCUMENTS

| 8,639,871 | B2 | 1/2014 | Borchers et al. |
| 9,207,985 | B2 | 12/2015 | Iyengar |
| 2019/0079674 | A1* | 3/2019 | Singh .................... G06F 3/0604 |

OTHER PUBLICATIONS

The disksim simulation environment version 4.0 reference manual (cmu-pdl-08-101). http://www.pdl.cmu.edu/PDL-FTP/DriveChar/CMU-PDL-08-101.pdf, 2008. Parallel Data Laboratory.
NVM Express revision 1.3. http://nvmexpress.org/wp-content/uploads/NVM_Express_Revision_1.3.pdf, 2017. NVM Express.
Chris Petersen et al., Solving latency challenges with NVM express SSDs at scale. https://www.flashmemorysummit.com/English/Collaterals/Proceedings/2017/20170809_SIT6_Petersen.pdf, 2017. Flash Memory Summit.

(Continued)

*Primary Examiner* — Jae U Yu
(74) *Attorney, Agent, or Firm* — IP & T Group LLP (57) ABSTRACT

A control device for controlling a memory device to process requests from a plurality of hosts may include a request controller configured to manage a set representing storage space allocated to each of the plurality of the hosts; and a set controller configured to monitor requests from the plurality of hosts and to adjust size of the set, wherein, when the request is a write request from a host among the plurality of hosts, the request controller selects a target physical address among physical addresses included in the set allocated to the host, the target physical address indicating where the request is to be processed.

20 Claims, 8 Drawing Sheets

(56) References Cited

OTHER PUBLICATIONS

Agrawal, N., Prabhakaran, V., Wobber, T., Davis, J. D., Manasse, M. S., and Panigrahy, R. Design tradeoffs for SSD performance. In USENIX Annual Technical Conference (2008).
Chiang, M.-L., Lee, P. C., Chang, R.-C., et al. Using data clustering to improve cleaning performance for flash memory. Software-Practice & Experience 29, 3 (1999), 267-290.
Dean, J., and Barroso, L. A. The tail at scale. Communications of the ACM 56, 2 (2013), 74-80.
Gulati, A., Shanmuganathan, G., Ahmad, I., Waldspurger, C., and Uysal, M. Pesto: online storage performance management in virtualized datacenters. In ACM Symposium on Cloud Computing (SoCC) (2011).
Han, J., Koo, D., Lockwood, G. K., Lee, J., Eom, H., and Hwang, S. Accelerating a burst buffer via user-level I/O isolation. In IEEE International Conference on Cluster Computing (CLUSTER) (2017).
Hsieh, J.-W., Kuo, T.-W., and Chang, L-P. Efficient identification of hot data for flash memory storage systems. ACM Transactions on Storage (TOS) 2, 1 (2006), 22-40.
Huang, J., Badam, A., Caulfield, L., Nath, S., Sengupta, S., Sharma, B., and Qureshi, M. K. Flashblox: Achieving both performance isolation and uniform lifetime for virtualized SSDs. In USENIX Conference on File and Storage Technologies (FAST) (2017).
Jun, B., and Shin, D. Workload-aware budget compensation scheduling for NVMe solid state drives. In IEEE Non-Volatile Memory System and Applications Symposium (NVMSA) (2015).
Kang, J.-U., Hyun, J., Maeng, H., and Cho, S. The multi-streamed solid-state drive. In USENIX Workshop on Hot Topics in Storage and File Systems (HotStorage) (2014).
Kang, W., Shin, D., and Yoo, S. Reinforcement learning-assisted garbage collection to mitigate long-tail latency in SSD. ACM Transactions on Embedded Computing Systems (TECS) 16, 5s (2017), 134.
Kavalanekar, S., Worthington, B., Zhang, Q., and Sharda, V. Characterization of storage workload traces from production Windows servers. In IEEE International Symposium on Workload Characterization (IISWC) (2008), 119-128.
Kim, B. S., and Min, S. L. QoS-aware flash memory controller. In IEEE Real-Time and Embedded Technology and Applications Symposium (RTAS) (2017), 51-61.
Kim, J. Lee, D., and Noh, S. H. Towards SLO complying SSDs through OPS isolation. In USENIX Conference on File and Storage Technologies (FAST) (2015).
Park, N., Ahmad, I., and Lilja, D. J. Romano: Autonomous storage management using performance prediction in multi-tenant datacenters. In ACM Symposium on Cloud Computing (SoCC) (2012).
Rho, E, Joshi, K., Shin, S.-U., Shetty, N. J., Hwang, J., Cho, S., Lee, D. D., and Jeong, J. Fstream: Managing flash streams in the file system. In USENIX Conference on File and Storage Technologies (FAST) (2018).
Shue, D., Freedman, M. J., and Shaikh, A. Performance isolation and fairness for multi-tenant cloud storage. In USENIX Symposium on Operating Systems Design and Implementation (OSDI) (2012), 349-362.
Song, X., Yang, J., and Chen, H. Architecting flash-based solid-state drive for high-performance I/O virtualization. IEEE Computer Architecture Letters 13, 2 (2014), 61-64.
Yan, S., Li, H., Hao, M., Tong, M. H., Sundararaman, S., Chien, A. A., and Gunawi, H. S. Tiny-tail flash: Near-perfect elimination of garbage collection tail latencies in NAND SSDs. In USENIX Conference on File and Storage Technologies (FAST) (2017), 15-28.
Yang, Z., Hoseinzadeh, M., Andrews, A., Mayers, C., Evans, D. T., Bolt, R. T., Bhimani, J., Mi, N., and Swanson, S. Autotiering: Automatic data placement manager in multi-tier all-flash datacenter. In IEEE International Performance Computing and Communications Conference (IPCCC) (2017).
Eyee Hyun Nam, Bryan Suk Joon Kim, Hyeonsang Eom, Sang Lyul Min: Ozone (O3): An Out-of-Order Flash Memory Controller Architecture. IEEE Trans. Computers 60(5): 653-666 (2011).
Yang Hu, Hong Jiang, Dan Feng, Lei Tian, Hao Luo, Shu Ping Zhang: Performance impact and interplay of SSD parallelism through advanced commands, allocation strategy and data granularity. 96-107.
Matias Bjørling, Jens Axboe, David W. Nellans, Philippe Bonnet: Linux block IO: introducing multi-queue SSD access on multi-core systems. SYSTOR 2013: 22:1-22:10.
Myoungsoo Jung, Mahmut T. Kandemir: Sprinkler: Maximizing resource utilization in many-chip solid state disks. HPCA 2014: 2014, IEEE 524-535.
Hyeong-Jun Kim, Young-Sik Lee, Jin-Soo Kim: NVMeDirect: A User-space I/O Framework for Application-specific Optimization on NVMe SSDs.HotStorage 2016.
Ziye Yang, James R. Harris, Benjamin Walker, Daniel Verkamp, Changpeng Liu, Cunyin Chang, Gang Cao, Jonathan Stern, Vishal Verma, Luse E. Paul: SPDK: A Development Kit to Build High Performance Storage Applications. CloudCom 2017: 2017, IEEE154-161.

\* cited by examiner

| Logical Address | Physical Address |
|---|---|
|  |  |
|  |  |
|  |  |
|  |  |

FIG. 5

| Set Number | Physical Address | | | |
|---|---|---|---|---|
| | | | | |
| | | | | |

FIG. 8

CONTROL DEVICE FOR DYNAMICALLY ALLOCATING STORAGE SPACE AND DATA STORAGE DEVICE INCLUDING THE CONTROL DEVICE

CROSS-REFERENCE TO RELATED APPLICATION

The present application claims priority to Korean Patent Application No. 10-2018-0116646, filed on Sep. 28, 2018, which is incorporated herein by reference in its entirety.

BACKGROUND

1. Field

Various embodiments of the present disclosure relate to a control device for dynamically allocating storage space for a plurality of hosts and a data storage device including the control device.

2. Description of the Related Art

A plurality of hosts can share a same data storage device. Any of the plurality of hosts may provide read or write requests to the data storage device. The plurality of hosts may correspond to a plurality of processors included in one computer device or may correspond to a plurality of computer devices or network devices connected via a network.

A solid state drive (SSD) device, which is widely used as a data storage device, includes a plurality of flash chips.

For example, the SSD device may have eight flash chips that are used by hosts A, B, and C at the same time.

Generally, the hosts A, B, and C share all eight flash chips or some of eight chips are allocated to each host in a fixed manner.

In the former case, multiple requests from hosts A, B, and C may interfere with each other, which may degrade performance.

For example, while a flash chip X processes a write request provided by host A, if host B provides a read request to flash chip X, processing the read request may be delayed. This delay may be exacerbated when the write request provided by host A is processed in parallel on a plurality of flash chips.

In an example of the latter case, four flash chips are allocated to host A and two flash chips are allocated to host B and C, respectively.

This can solve the host-to-host interference concern in the former case, but causes new concerns.

For example, if a large storage space is allocated to host A and the storage space is not fully utilized by host A, then the storage space is not used efficiently. If host B having a small storage space generates a lot of random write requests, a garbage collection operation occurs frequently, and overall performance is degraded. If host C having a small storage space generates a lot of read requests, performance may also be degraded for the limited resources.

SUMMARY

Various embodiments are directed to a control device that dynamically adjusts size of each storage space allocated to a host among a plurality of hosts, and a data storage device including the control device.

In an embodiment, a control device for controlling a memory device to process requests from a plurality of hosts may include a request controller configured to manage a set representing storage space allocated to each of the plurality of the hosts; and a set controller configured to monitor requests from the plurality of hosts and to adjust size of the set, wherein, when the request is a write request from a host among the plurality of hosts, the request controller selects a target physical address among physical addresses included in the set allocated to the host, the target physical address indicating where the request is to be processed.

In an embodiment, a data storage device shared by a plurality of hosts to read or write data may include a memory device; and a control device configured to control the memory device to process requests from the plurality of hosts, wherein the control device comprises a request controller configured to manage a set representing storage space allocated to each of the plurality of the hosts; and a set controller configured to monitor requests from the plurality of hosts and to adjust size of the set, wherein when the request is a write request from a host among the plurality of hosts, the request controller selects a target physical address among physical addresses included in the set allocated to the host, the target physical address indicating where the request is to be processed.

DETAILED DESCRIPTION

Various embodiments are described below in more detail with reference to the accompanying drawings. Throughout the specification, reference to "an embodiment," "another embodiment" or the like is not necessarily to only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Hereinafter, the various embodiments of the present invention will be described in detail with reference to the attached drawings.

Figure 1:
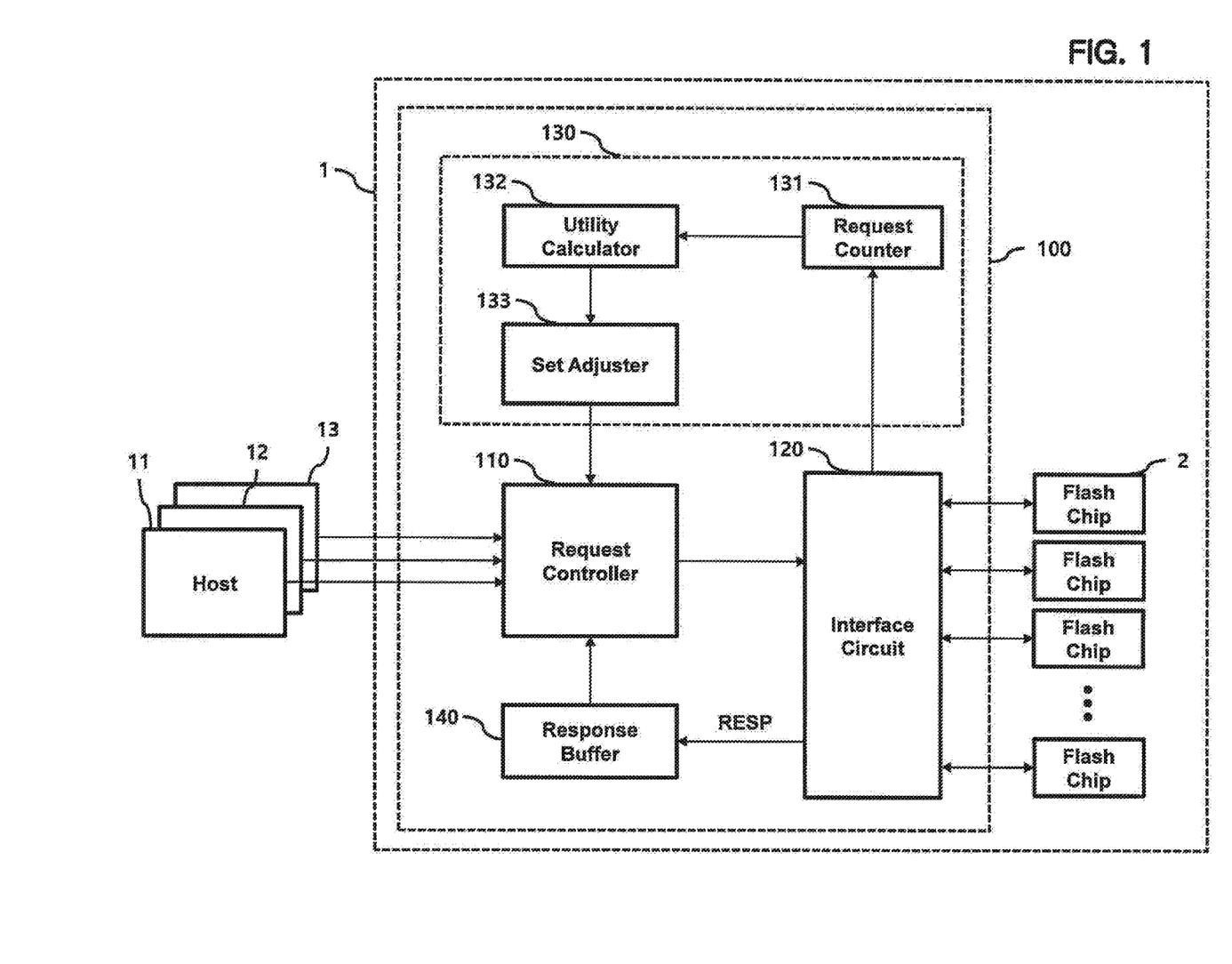
FIGS. 1 and 2 are block diagrams that illustrate data storage devices according to embodiments of the present disclosure.

FIG. 1 is a block diagram illustrating a data storage device 1 according to an embodiment of the present disclosure.

Referring to FIG. 1, the data storage device 1 includes a control device 100 and a plurality of flash chips 2.

The flash chips 2 is an example of a memory device, various types of which may be used according to embodiments. For example, a phase-change memory device, a magnetic memory device, a disk storage device, or the like may be used.

A plurality of hosts 11, 12 and 13 may share the data storage device 1, and each provides a read or write request to the data storage device 1.

In the embodiment shown in FIG. 1, the number of hosts is three and the number of flash chips is eight. However, the present invention is not limited to this specific configuration. In another embodiment, a different number of hosts and a different number of flash chips may be employed.

The control device 100 includes a request controller 110, an interface circuit 120, a set controller 130 and a response buffer 140.

The request controller 110 controls read or write requests provided by the hosts 11, 12 and 13.

The data storage device 1 includes a plurality of flash chips 2. Accordingly, the request controller 110 may further control the operations required by the flash chips 2, such as a wear level operation or a garbage collection operation.

The request controller 110 stores mapping information regarding relationships between logical addresses and physical addresses.

The request controller 110 stores information on the storage space, for example, a range of physical addresses, allocated to each of the hosts 11, 12 and 13. A range of physical addresses assigned to a host may be referred as a set.

A unit of a physical address constituting a set may be variously changed according to embodiments. For example, a page, a block, a die included in a chip, a chip, or a channel including a plurality of chips may be used as a unit of a physical address.

In an embodiment, a chip is used as a unit of a physical address and the number of chips included in a set may represent a size of a set. In an embodiment, at least one chip is included in a set.

Figure 3:
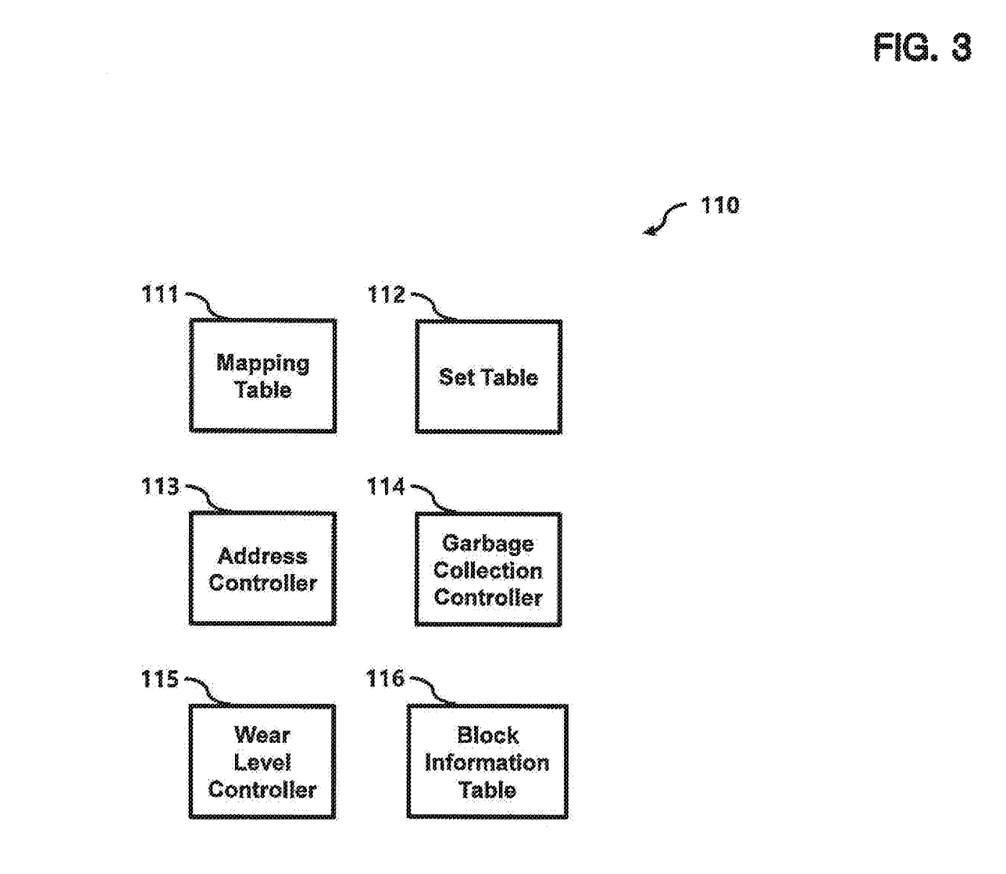
FIG. 3 is a block diagram that illustrates a request controller according to an embodiment of the present disclosure.

FIG. 3 is a block diagram illustrating a request controller 110 according to an embodiment of the present disclosure.

Referring to FIG. 3, the request controller 110 may include a mapping table 111, a set table 112, an address controller 113, a garbage collection controller 114, a wear level controller 115 and a block information table 116.

Figure 4:
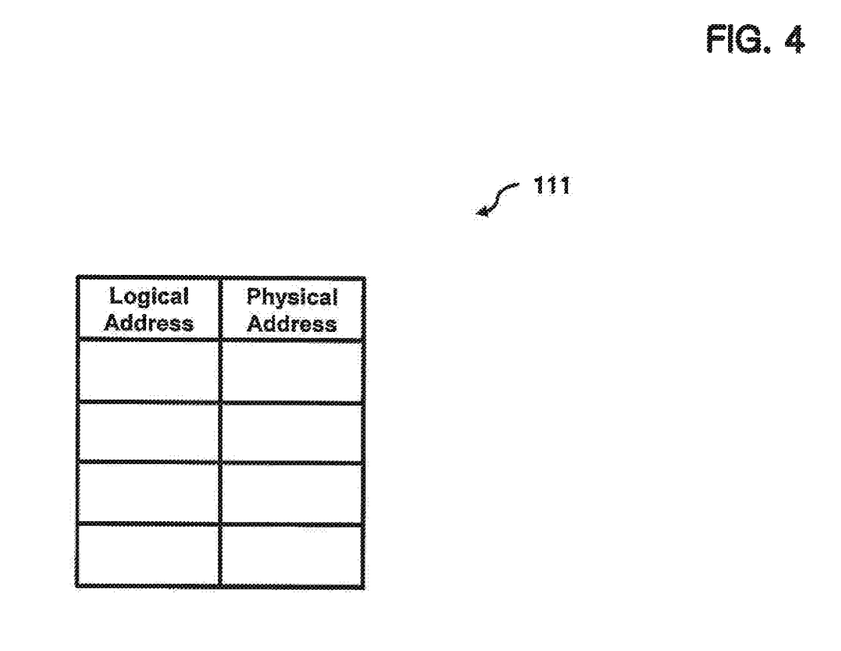
FIG. 4 is a block diagram that illustrates a mapping table according to an embodiment of the present disclosure.

FIG. 4 is a block diagram illustrating the mapping table 111 according to an embodiment of the present disclosure.

Referring to FIG. 4, the mapping table 111 is a table for storing mapping information regarding relationships between logical addresses and physical addresses.

The mapping table 111 is not limited to the embodiment shown in FIG. 4, and may be designed in various forms as those skilled in the art understand.

For example, the logical address and the physical address may be variously configured to have a block unit, and a page unit. Moreover, a mapping table of a block unit and a mapping table of a page unit may be combined to form the mapping table 111.

Referring again to FIG. 3, the set table 112 is a data structure indicating relationships between physical addresses and sets each allocated to a corresponding host.

In this embodiment, a table may be used. However, in another embodiment, a bit vector may be used instead of a table as a data structure representing the set table 112.

Contiguous or discontinuous physical addresses may be allocated to a set. For example, physical addresses included in one chip may be allocated to one set. Alternatively, physical addresses included in a plurality of chips may be allocated to one set.

Figure 5:
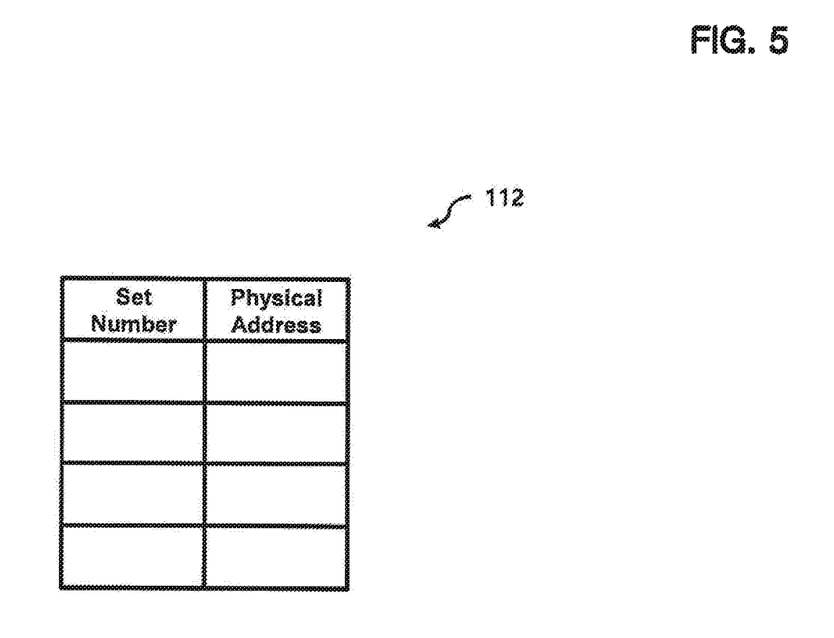
FIG. 5 is a block diagram that illustrates a set table according to an embodiment of the present disclosure.

FIG. 5 is a block diagram illustrating a structure of the set table 112 according to an embodiment of the present disclosure.

Referring to FIG. 5, the set table 112 includes a field indicating a set number and a field indicating a physical address (physical address field).

In an embodiment, a set corresponds to a host. Therefore, a set number may represent a host number.

In this embodiment, since the size of a set is adjusted in units of chips, one or more chip numbers corresponding to a set number may be stored in a physical address field.

For example, chip numbers of the first to fourth flash chips are stored in the physical address field corresponding to the set number of the host 11. Chip numbers of the fifth and sixth flash chips are stored in the physical address field corresponding to the set number of the host 12. Chip numbers of the seventh and eighth flash chips may be stored in the physical address field corresponding to the set number of the host 13.

Referring again to FIG. 3, the set table 112 may be dynamically controlled by the set controller 130 to dynamically adjust sizes of sets each assigned to a host.

The address controller 113 selects a physical address where a write operation is to be performed when a write operation is required. The physical address on which the write operation is to be performed may be referred to as a target physical address.

For example, the address controller 113 may select a target physical address to which a write operation is to be performed when a write request is received from a host.

The address controller 113 refers to the set table 112 to determine one or more flash chips included in a set from a set number corresponding to a host. Then, the address controller 113 selects a physical address to perform a write operation among the free blocks included in the corresponding flash chips.

The selected physical address with the requested logical address may be used to update the information of the mapping table 111.

In this embodiment, the size of a set may be dynamically adjusted. Accordingly, a block storing data owned by, or assigned to, the host 11 may exist in a chip owned by, or assigned to, the host 12.

In the present embodiment, it is assumed that write-requested data is not written in a block storing data owned by a host other than the host requesting the write operation.

For example, in the above case, if the host 12 provides a write request, the address controller 113 does not select an empty page in the block storing the data owned by the host 11.

For this, a block information table 116, shown in FIG. 3, may be included in the present embodiment.

The block information table 116 stores information of a host or a set that owns a block storing valid data.

Accordingly, the address controller 113 may refer to the set table 112 and the block information table 116 together when selecting a block to which a write request is to be processed so that data owned by different hosts are not stored in a single block.

The block information table 116 may further store meta information corresponding to each block. For example, the meta information may include the time at which data was last written to a block, the number of valid pages, the number of erase operations performed on a block, and the number of program operations performed on a block.

The garbage collection controller 114 controls garbage collection operations with respect to the flash chips 2. The wear level controller 115 controls wear level operations with respect to the flash chips 2.

Since the garbage collection wear level operations are well-known, description thereof is omitted.

A variety of known techniques may be used to select a victim block during a garbage collection operation.

When a victim block is selected, it may be further considered whether a host that owns a flash chip in which the victim block is stored differs from a host that owns the victim block.

This reduces the impact of other hosts on a set owned by a host.

In addition, when a valid page belonging to the victim block is moved during the garbage collection operation, it is desirable to select an available physical address in a flash chip allocated to the host that owns the victim block.

For this, the address controller 113 may refer to the set table 112 and the block information table 116.

The wear level operation distributes the number of writes or erases evenly to prevent a reduction of a lifespan of a flash chip.

In this embodiment, an object block whose erase count exceeds a threshold is selected and valid data of the object block is moved to a target block whose erase count is less than the threshold.

In this embodiment, when selecting the target block, a free block included in a set that owns the object block may be selected. Thereafter, the mapping table 111 and the block information table 116 may be updated.

Referring again to FIG. 1, the interface circuit 120 schedules a read or write requests, a wear level request, a garbage collection request provided from the request controller 110. Further, the interface circuit 120 controls a flash chip 2 by providing a command corresponding to the selected request.

Figure 6:
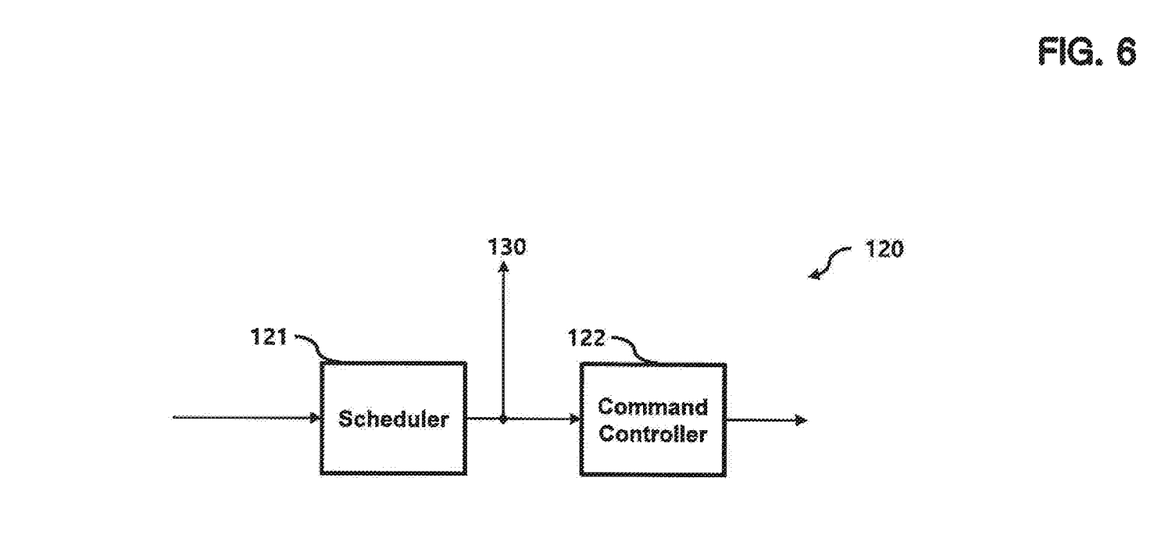
FIG. 6 is a block diagram that illustrates an interface circuit according to an embodiment of the present disclosure.

FIG. 6 is a block diagram illustrating an interface circuit 120 according to an embodiment of the present disclosure.

Referring to FIG. 6, the interface circuit 120 may include a scheduler 121 and a command controller 122. The scheduler 121 may schedule a plurality of requests and output a selected request. The command controller 122 may generate a command corresponding to the selected request and provide the command to the plurality of flash chips 2.

Information on the selected request at the scheduler 121 may be provided to the set controller 130.

With secondary reference to FIG. 1, along with FIG. 6, the set controller 130 dynamically adjusts size of a set each allocated to a host.

In this embodiment, the set controller 130 adjusts size of a set at a fixed or predetermined period. The time and frequency of adjusting the set size may be variously changed according to embodiments.

In this embodiment, the set controller 130 includes a request counter 131, a utility calculator 132, and a set adjuster 133.

In the present embodiment, the request counter 131 tracks the number of requests for each unit physical address and for each host at a fixed or predetermined period.

In this embodiment, the number of requests is tracked for each flash chip and for each host. Specific tracking criteria may be changed according to embodiments.

In this embodiment, the utility calculator 132 calculates a utility for a set allocated to each host.

In this embodiment, the utility is calculated using Equation 1 and has a value between 0 and 1.

$$Util(t, S) = \frac{\sum_{c=1}^{8} N_r(t, c)}{\sum_{c=1}^{8} \frac{N_r(t, c)}{1 - \text{Traffic}(c, S)}} \quad \text{[Equation 1]}$$

In Equation 1, c is a variable representing a flash chip, t is a variable representing a host, and S is a variable representing a set.

In Equation 1, $N_r(t, c)$ represents an expected value of the number of read requests sent from a host t to a flash chip c.

In the present embodiment, the number of read requests tracked by the request counter 131 for a predetermined period is used as a value of $N_r(t, c)$.

In Equation 1, Traffic(c, S) represents an expected value of the traffic at a flash chip c for a set S and has a value between 0 and 1.

In Equation 1, denominator means the summation of a weighted value and the number of read requests.

The weighted value is calculated using the expected value of the traffic.

For example, if traffic to a flash chip increases for a given set, the utility value for that flash chip decreases. When traffic to the flash chip decreases, the value of the utility for that flash chip increases.

The traffic is calculated using Equation 2.

$$\text{Traffic}(c, S) = \frac{\sum_{r=1}^{3} [N_r(t, c) \times L_r + N_p(t, c, S) \times L_p]}{T_{window}} \quad \text{[Equation 2]}$$

In Equation 2, $L_r$ represents read latency at a flash chip, $L_p$ represents program latency at a flash chip, and $T_{window}$ represents a predetermined period for adjusting size of a set.

In this embodiment, the erase latency is ignored considering that number of erase operations is low relative to the number of entire operations. Particularly, when the number of pages per block increases, the influence of the erase latency may be further reduced.

$N_r(t, c)$ in Equation 2 is the same as in Equation 1.

In Equation 2, $N_p(t, c, S)$ represents an expected value of the number of program operations performed at a flash chip c for a given set S.

The number of program operations includes number of write requests sent by a host t to a flash chip c belonging to a set S and number of other program operations sent to the flash chip c included in the set S.

In this embodiment, $N_p(t, c, S)$ is calculated according to Equation 3.

$$N_p(t, c, S) = \begin{cases} \dfrac{N_w(t) \times WAF(t)}{|S_t|} & \text{if } c \text{ is in } S_t \\ 0 & \text{otherwise} \end{cases} \quad \text{[Equation 3]}$$

In Equation 3, $S_t$ denotes a set allocated to the host t, and $|S_t|$ denotes size of the set allocated to the host t.

In Equation 3, $N_w(t)$ is an estimate of the number of write operations at a flash chip c caused by a write request from a host t, except for garbage collection.

In the present embodiment, the number of write requests tracked by the request counter 131 for a predetermined period is used as a value of $N_w(t)$.

Since the garbage collection operation occurs intermittently, the number of programs due to garbage collection may vary greatly according to the predetermined period.

Accordingly, in the present embodiment, $N_w(t)$ is multiplied by an amplification ratio WAF(t) considering an effect by the garbage collection operation.

In Equation 3, WAF(t) represents the number of times a valid page is moved and stored during a garbage collection operation, which is tracked and approximated by the request counter 131.

The set adjuster 133 adjusts the size of a set allocated to each host using a utility of the host tracked at a predetermined period.

Information about the size of the set is stored in a set table 112 included in the request controller 110, as shown in FIG. 3.

Figure 7:
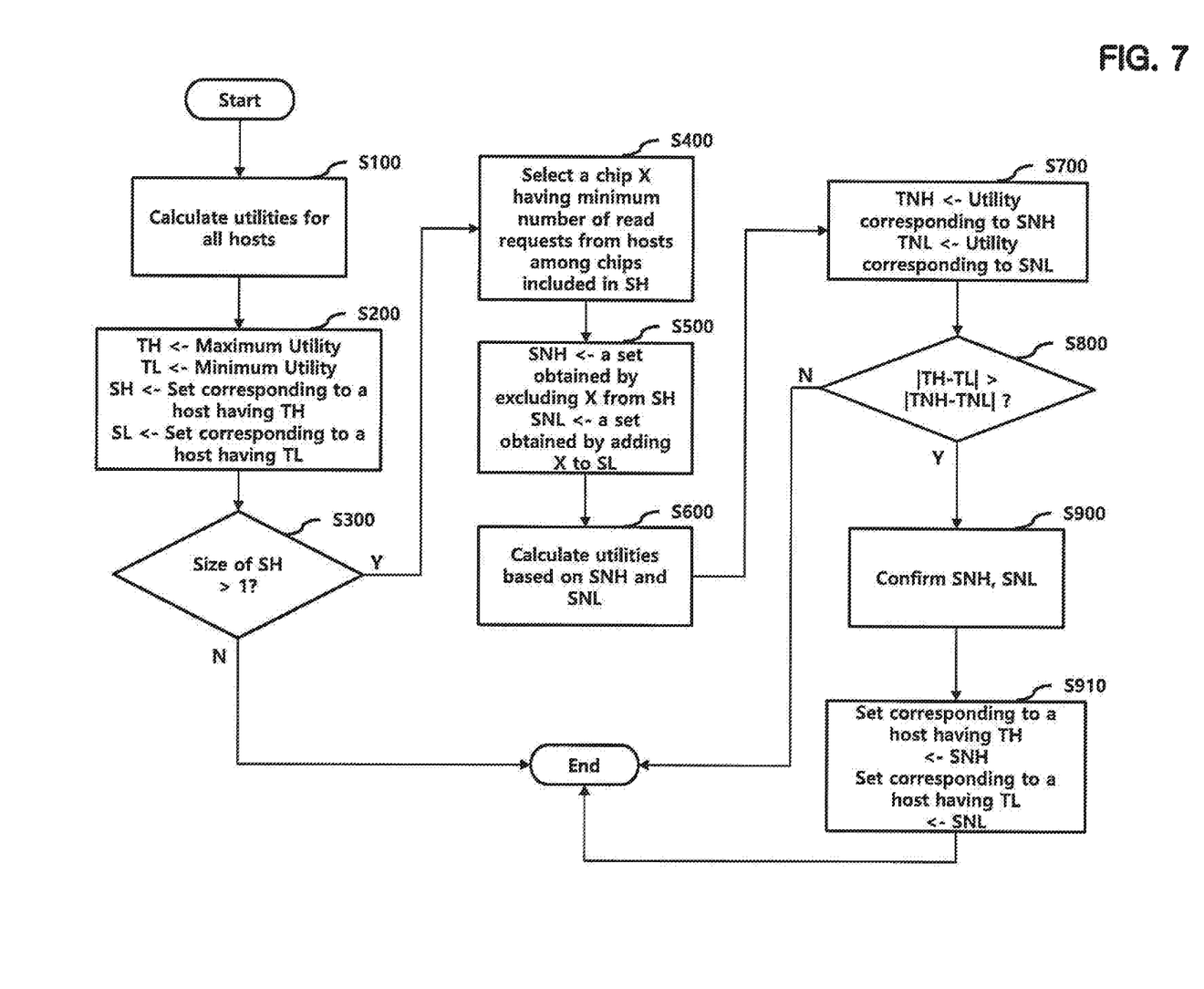
FIGS. 7 and 8 are flow charts illustrating a method for adjusting sets according to embodiments of the present disclosure.

FIG. 7 is a flowchart illustrating a method of adjusting a set according to an embodiment of the present disclosure.

The operation of FIG. 7 may be controlled by the set adjuster 133 of FIG. 1.

Referring to FIG. 7, at step S100, utilities of all hosts may be calculated by the utility calculator 132. Each utility may be calculated using Equations 1 to 3.

At step S200, the maximum utility is set to TH, the minimum utility is set to TL, a set corresponding to the host having TH is set to SH and a set corresponding to the host having TL is set to SL.

At step S300, it is checked whether the size of the SH is greater than 1.

In this embodiment, the size of a set is specified based on the number of chips included in the set. For example, the size of a set may be 1, which indicates that one chip is assigned to a set. In this embodiment, the minimum size of a set is 1.

Accordingly, when the size of SH is 1 or less (N at S300), the size of the set is not adjusted and the process terminates.

If the size of SH is greater than 1 (Y at S300), a chip X having the minimum number of read requests from a host among chips included in SH is selected at step S400.

Since the size of SH is greater than one, SH is associated with at least two chips.

The chip X having the smallest number of read requests from the host may be selected among the chips.

At step S500, in SH, a set obtained by excluding the chip X from SH is designated as SNH, and a set obtained by adding the chip X to SL is designated as SNL. This is a temporary adjustment of sets, which will be confirmed later.

Steps S400 and S500 are methods for evenly distributing utilities by moving a relatively less utilized chip from a set having higher utility to a set having lower utility.

At step S600, utilities are recalculated by the utility calculator 132 assuming that the sets SH and SL are adjusted to SNH and SNL.

At step S700, the utility corresponding to the SNH is designated as TNH, and the utility corresponding to SNL is designated as TNL.

At step S800, it is checked whether the difference between TH and TL is greater than the difference between TNH and TNL.

The fact that the difference between TH and TL is not greater than the different between TNH and TNL means that even if the set is changed, the difference in utilities is not reduced.

If the difference between TH and TL is greater (Y at S800), new sets SNH and SNL are confirmed at step S900.

At step S910, SNH is designated as a set of a host having TH and SNL is designated as a set of a host having TL. Thus, the value of the set table 112 is adjusted.

Returning to FIG. 1, the response buffer 140 stores the received data in response to the read request.

Data output from the flash chip 2 may be received in the response buffer 140 via the interface circuit 120 or via a separate data bus.

The response buffer 140 may provide the request controller 110 with the receive data.

The data stored in the response buffer 140 may be provided to the host via the request controller 110 or via a separate data bus.

Since the data path including the response buffer 140 may be variously changed with reference to the conventional technology, a detailed description thereof will be omitted.

Figure 2:
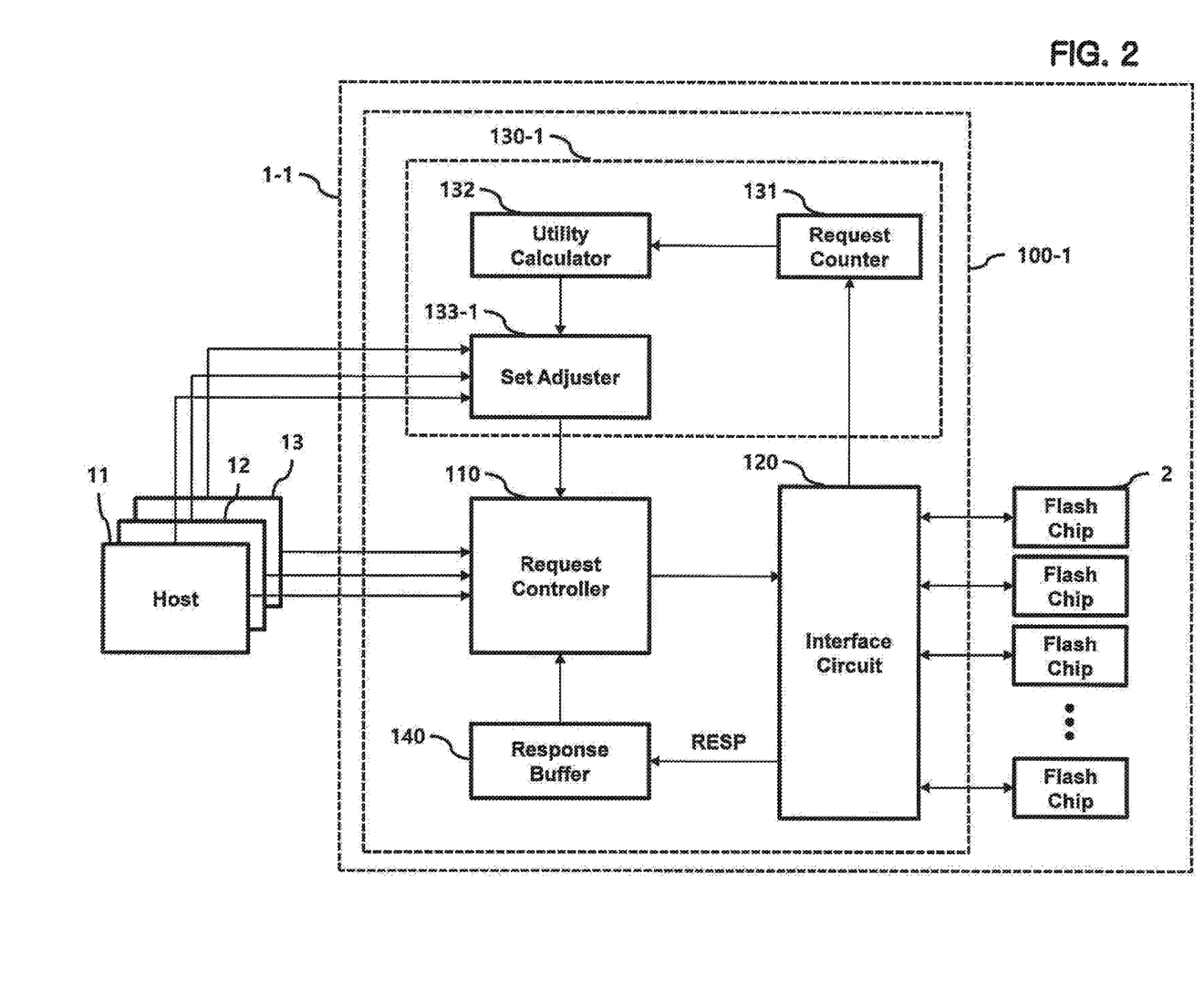

FIG. 2 shows a data storage device 1-1 according to an embodiment of the present disclosure.

The data storage device 1-1 of FIG. 2 is substantially the same as the data storage device 1 of FIG. 1.

However, in the data storage device 1-1 of FIG. 2, the control device 100-1 may receive the target performance value designated by the hosts 11, 12, and 13.

The target performance value may be received by the set controller 130-1.

In this embodiment, it is possible to determine whether to adjust the set considering the target performance value of each host received by the set adjuster 133-1.

The target performance value provided by each host may be converted into a set size according to a predetermined rule.

Thus, each host may provide the minimum set size required by each host instead of the target performance value.

The set adjuster 133-1 may determine whether the minimum set size requirement required by each host is satisfied before change of the set size of each host is confirmed using the method of FIG. 7.

Figure 8:
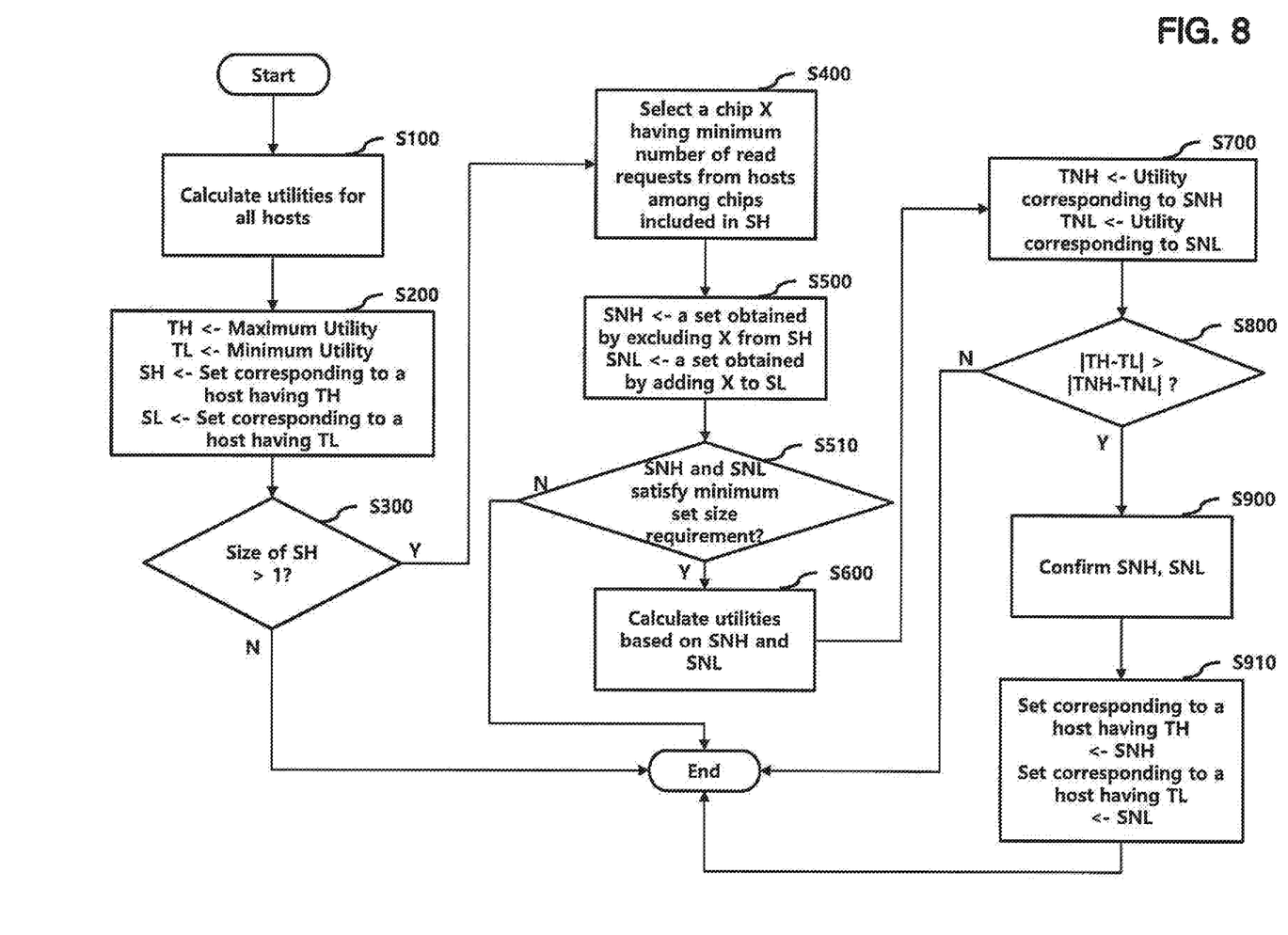

FIG. 8 is a flowchart showing a method of adjusting a set according to an embodiment of the present disclosure.

The flowchart of FIG. 8 is substantially the same as the flowchart of FIG. 7, but further includes a step S510. In step S510, it is determined whether SHN and SNL satisfy a minimum set size required by each host.

If minimum set size condition is satisfied, the next step can be performed, and if not, the process can be terminated.

Although various embodiments have been illustrated and described, it will be apparent to those skilled in the art in light of the present disclosure that various changes and modifications may be possible. The present invention encompasses all such changes and modifications that fall within the scope of the claims.

What is claimed is:

1. A control device for controlling a memory device to process requests from a plurality of hosts, the control device comprising:
   a request controller configured to manage a set representing storage space allocated to each of the plurality of the hosts; and
   a set controller configured to monitor requests from the plurality of hosts and to adjust size of the set,
   wherein, when the request is a write request from a host among the plurality of hosts, the request controller selects a target physical address among physical addresses included in the set allocated to the host, the target physical address indicating where the request is to be processed,
   wherein the request controller comprises:
   a mapping table storing information regarding mapping relationship between a physical address and a logical address;
   a set table storing information on storage space corresponding to a set for each of the hosts; and
   an address controller configured to select the target physical address referring to the mapping table or the set table,
   wherein the memory device includes a plurality of blocks and the request controller further includes a block information table storing state of a block, and wherein the block information table stores information on a host that owns data stored in a block.

2. The control device of claim 1, wherein the request controller further comprises a garbage collection controller configured to move a valid page included in a victim block referring to the block information table, the mapping table or the set table.

3. The control device of claim 2, wherein the address controller selects a target physical address for garbage collection operation included in a set corresponding to a host that owns the victim block referring to the set table or the block information table, and the garbage collection controller generates a request to copy a valid page included in the victim block to the target physical address for garbage collection operation.

4. The control device of claim 1, wherein the request controller further comprises a wear level controller configured to move a selected block referring to the block information table, the mapping table or the set table.

5. The control device of claim 4, wherein the address controller selects a target physical address for wear level operation included in a set corresponding to a host that owns the selected block referring to the set table or the block information table, and the wear level controller generates a request to copy a valid page included in the selected block to the target physical address for wear level operation.

6. A control device for controlling a memory device to process requests from a plurality of hosts, the control device comprising:
   a request controller configured to manage a set representing storage space allocated to each of the plurality of the hosts; and
   a set controller configured to monitor requests from the plurality of hosts and to adjust size of the set,
   wherein, when the request is a write request from a host among the plurality of hosts, the request controller selects a target physical address among physical addresses included in the set allocated to the host, the target physical address indicating where the request is to be processed, and
   wherein the set controller comprises:
   a request counter configured to track the number of requests for a predetermined period for each host;
   a utility calculator configured to calculate utility values each representing utilization of a set by a host referring to the request counter; and
   a set adjuster configured to adjust size of a set such that difference between the utility values decreases.

7. The control device of claim 6, wherein the set adjuster reallocates storage space included in a set corresponding to a host having the maximum utility value to a set corresponding to a host having the minimum utility value.

8. The control device of claim 6, wherein the set adjuster adjusts, for each of the hosts, the size of a set referring to target performance values provided from the plurality of hosts.

9. The control device of claim 6, further comprising:
   a scheduler configured to schedule a request provided from the request controller; and
   a command controller configured to control the memory device by generating a command signal corresponding to a request output from the scheduler.

10. The control device of claim 6, further comprising:
    a response buffer configured to store data output from the memory device.

11. A data storage device shared by a plurality of hosts to read or write data, the data storage device comprising:
    a memory device; and
    a control device configured to control the memory device to process requests from the plurality of hosts,
    wherein the control device comprises:
    a request controller configured to manage a set representing storage space allocated to each of the plurality of the hosts; and
    a set controller configured to monitor requests from the plurality of hosts and to adjust size of the set,
    wherein when the request is a write request from a host among the plurality of hosts, the request controller selects a target physical address among physical addresses included in the set allocated to the host, the target physical address indicating where the request is to be processed,
    wherein the request controller comprises:
    a mapping table storing information regarding mapping relationship between a physical address and a logical address;
    a set table storing information on storage space corresponding to a set for each of the hosts; and
    an address controller configured to select the target physical address referring to the mapping table or the set table, and
    wherein the memory device includes a plurality of blocks and the request controller further includes a block information table storing state of a block, and wherein the block information table stores information on a host that owns data stored in a block.

12. The data storage device of claim 11, wherein the request controller further comprises a garbage collection controller configured to move a valid page included in a victim block referring to the block information table, the mapping table or the set table.

13. The data storage device of claim 12, wherein the address controller selects a target physical address for garbage collection operation included in a set corresponding to a host that owns the victim block referring to the set table or the block information table, and the garbage collection controller generates a request to copy a valid page included in the victim block to the target physical address for garbage collection operation.

14. The data storage device of claim 11, wherein the request controller further comprises a wear level controller configured to move a selected block referring to the block information table, the mapping table or the set table.

15. The data storage device of claim 14, wherein the address controller selects a target physical address for wear level operation included in a set corresponding to a host that owns the selected block referring to the set table or the block information table, and the wear level controller generates a request to copy a valid page included in the selected block to the target physical address for wear level operation.

16. A data storage device shared by a plurality of hosts to read or write data, the data storage device comprising:
 a memory device; and
 a control device configured to control the memory device to process requests from the plurality of hosts,
 wherein the control device comprises:
 a request controller configured to manage a set representing storage space allocated to each of the plurality of the hosts; and
 a set controller configured to monitor requests from the plurality of hosts and to adjust size of the set,
 wherein when the request is a write request from a host among the plurality of hosts, the request controller selects a target physical address among physical addresses included in the set allocated to the host, the target physical address indicating where the request is to be processed,
 wherein the set controller comprises:
 a request counter configured to track the number of requests for a predetermined period for each host;
 a utility calculator configured to calculate utility values each representing utilization of a set by a host referring to the request counter; and
 a set adjuster configured to adjust size of a set such that difference between the utility values decreases.

17. The data storage device of claim 16, wherein the set adjuster reallocates storage space included in a set corresponding to a host having the maximum utility value to a set corresponding to a host having the minimum utility value.

18. The data storage device of claim 16, wherein the set adjuster adjusts, for each of the hosts, the size of a set referring to target performance values provided from the plurality of hosts.

19. The data storage device of claim 16, further comprising:
 a scheduler configured to schedule a request provided from the request controller; and
 a command controller configured to control the memory device by generating a command signal corresponding to a request output from the scheduler.

20. The data storage device of claim 16, further comprising:
 a response buffer configured to store data output from the memory device.

* * * * *